US011126839B2

(12) United States Patent
Ghessassi

(10) Patent No.: US 11,126,839 B2
(45) Date of Patent: Sep. 21, 2021

(54) DOCUMENT CLUSTERING AND RECONSTRUCTION

(71) Applicant: Digitech Systems Private Reserve, LLC, Greenwood Village, CO (US)

(72) Inventor: Karim Ghessassi, Parker, CO (US)

(73) Assignee: DIGITECH SYSTEMS PRIVATE RESERVE, LLC, Greenwood Village, CO (US)

( * ) Notice: Subject to any disclaimer, the term of this patent is extended or adjusted under 35 U.S.C. 154(b) by 1110 days.

(21) Appl. No.: 14/194,063

(22) Filed: Feb. 28, 2014

(65) Prior Publication Data

US 2014/0280167 A1    Sep. 18, 2014

Related U.S. Application Data

(60) Provisional application No. 61/782,842, filed on Mar. 14, 2013, provisional application No. 61/782,968, filed on Mar. 14, 2013, provisional application No. 61/783,012, filed on Mar. 14, 2013, provisional application No. 61/783,045, filed on Mar. 14, 2013, provisional application No. 61/782,893, filed on Mar. 14, 2013.

(51) Int. Cl.
| | |
|---|---|
| *G06F 17/24* | (2006.01) |
| *G06K 9/00* | (2006.01) |
| *G06F 16/28* | (2019.01) |
| *G06F 16/93* | (2019.01) |
| *G06F 40/186* | (2020.01) |

(52) U.S. Cl.
CPC ....... *G06K 9/00483* (2013.01); *G06F 16/285* (2019.01); *G06F 16/93* (2019.01); *G06F 40/186* (2020.01)

(58) Field of Classification Search
CPC .............. G06F 17/211; G06F 17/2247; G06F 17/30011; G06F 17/3061; G06F 17/30643; G06F 17/30648; G06F 17/30696; G06F 17/30896; G06F 17/30598; G06F 17/248; G06F 16/285; G06F 16/93; G06K 9/00483
USPC ........................................................ 707/738
See application file for complete search history.

(56) References Cited

U.S. PATENT DOCUMENTS

| | | | |
|---|---|---|---|
| 7,430,717 B1 | 9/2008 | Spangler | |
| 7,742,953 B2* | 6/2010 | King | G06F 17/218 235/380 |
| 8,005,720 B2* | 8/2011 | King | H04N 1/00244 705/26.1 |
| 8,249,871 B2 | 8/2012 | Mukerjee | |

(Continued)

*Primary Examiner* — Hosain T Alam
*Assistant Examiner* — Saba Ahmed
(74) *Attorney, Agent, or Firm* — Sheridan Ross P.C.

(57) ABSTRACT

A scanner scans a group of documents. For example, the documents can be a group of invoices. The documents are received and processed. Objects (e.g., a text object, such as a word) and their locations are identified in each of the documents. Occurrences of similar objects in the identified locations between the documents are determined. A document sorting algorithm is applied to generate a score for each of the documents. The score for each of the documents is generated based on a number of occurrences of similar objects between the documents. The generated score of each of the documents is used to identify a template document. The template document is then used to cluster the documents.

20 Claims, 9 Drawing Sheets

(56) References Cited

U.S. PATENT DOCUMENTS

| | | | |
|---|---|---|---|
| 8,509,525 B1* | 8/2013 | Urbach | G06K 9/00449 |
| | | | 345/440 |
| 8,843,494 B1* | 9/2014 | Sampson | G06K 9/00463 |
| | | | 707/737 |
| 8,954,440 B1* | 2/2015 | Gattani | G06F 17/30011 |
| | | | 707/738 |
| 9,507,758 B2* | 11/2016 | Bleiweiss | G06F 17/2235 |
| 2002/0083079 A1 | 6/2002 | Meier et al. | |
| 2006/0116994 A1* | 6/2006 | Jonker | G06F 17/30017 |
| 2007/0189615 A1* | 8/2007 | Liu | G06K 9/38 |
| | | | 382/232 |
| 2007/0217701 A1* | 9/2007 | Liu | G06K 9/38 |
| | | | 382/234 |
| 2009/0043824 A1* | 2/2009 | Claghorn | G06F 17/30011 |
| 2010/0312797 A1* | 12/2010 | Peng | G06F 17/30011 |
| | | | 707/776 |
| 2011/0137900 A1* | 6/2011 | Chang | G06F 17/30707 |
| | | | 707/737 |
| 2013/0054620 A1* | 2/2013 | Stokes | G06F 17/3028 |
| | | | 707/749 |
| 2013/0304742 A1* | 11/2013 | Roman | G06F 17/30598 |
| | | | 707/740 |
| 2014/0029857 A1* | 1/2014 | Kompalli | G06K 9/00483 |
| | | | 382/212 |

* cited by examiner

| | |
|---|---|
| aaa | the ?uick ?rown fox jumps ?ver the ?azy dog |
| bbb | the quick brown ?ox jumps ??er the ??zy dog |
| ccc | t?e quick ??own ??x ?ump? over ??e ?az? dog |
| ddd | the quick brown fox jumps over the lazy d?? |
| eee | the ?ui?k b?own fo? jump? over the lazy d?g |

| OBJECT | OCCURRENCES |
|---|---|
| the | 8 |
| jumps | 3 |
| dog | 3 |
| quick | 3 |
| over | 3 |
| fox | 2 |
| brown | 2 |
| lazy | 2 |
| aaa | 1 |
| ?uick | 1 |
| ?rown | 1 |
| ?ver | 1 |
| ?azy | 1 |
| bbb | 1 |
| ?ox | 1 |
| ??er | 1 |
| ??zy | 1 |
| ccc | 1 |
| t?e | 1 |
| ??own | 1 |
| ??x | 1 |
| ?ump? | 1 |
| ??e | 1 |
| ?az? | 1 |
| ddd | 1 |
| t?? | 1 |
| d?? | 1 |
| eee | 1 |
| ?ui?k | 1 |
| b?own | 1 |
| fo? | 1 |
| jump? | 1 |
| d?g | 1 |

FIG. 4 aaa  the ?uick brown fox jumps over the lazy dog — 101A
bbb  the quick ?rown fox jumps over the lazy dog — 101B
ccc  the quick brown ?ox jumps over the lazy dog — 101C
ddd  the quick brown fox ?umps over the lazy dog — 101D
eee  the quick brown fox jumps ?ver the lazy dog — 101E

FIG. 5

| OBJECT | OCCURRENCES | CERTAINTY |
|--------|-------------|-----------|
| the    | 5           | 100%      |
| the    | 5           | 100%      |
| lazy   | 5           | 100%      |
| dog    | 5           | 100%      |
| over   | 4           | 80%       |
| jumps  | 4           | 80%       |
| fox    | 4           | 80%       |
| brown  | 4           | 80%       |
| quick  | 4           | 80%       |
| eee    | 1           | 20%       |
| ddd    | 1           | 20%       |
| ccc    | 1           | 20%       |
| bbb    | 1           | 20%       |
| aaa    | 1           | 20%       |
| ?ver   | 1           | 20%       |
| ?umps  | 1           | 20%       |
| ?uick  | 1           | 20%       |
| ?rown  | 1           | 20%       |
| ?ox    | 1           | 20%       |

Company ABC
56000 West Scott Road
Portland Oregon, 85677

Monthly invoice to Company XYZ for goods shipped to Company XYZ
for the period of:
June 2010 to July 2010.

```
    Item              Individual Cost        Total Cost
    5 XYZ Widgets     $200.00                $1,000.00
    1 ABC Widget      $420.00                  $420.00
    2 CCC Widgets     $100.00                  $200.00

Total Invoice: $1,620.00
```

_101G_

Company ABC    | Note to Billing |  — 900
56000 West
Portland Or

Monthly invoice ta Company XYZ for goods shipped to Company XYZ
for the period of:
July 2010 to August 2010.

```
    Item              Individual Cost        Total Cost
    5 XYZ Widgets     $200.00                $1,000.00
    1 LLL Widget      $600.00                  $600.00
    3 CCC Widgets     $100.00                  $300.00

Total Invoice:    $1,900.00
```

FIG. 9

DOCUMENT CLUSTERING AND RECONSTRUCTION

CROSS REFERENCE TO RELATED APPLICATIONS

This application claims the benefit under 35 U.S.C. § 119(e) of U.S. Provisional Application No. 61/782,842, filed Mar. 14, 2013, entitled "PAGE ALIGNMENT AND CORRECTION," U.S. Provisional Application No. 61/782,968 entitled "PAGE CLASSIFICATION," filed Mar. 14, 2013, U.S. Provisional Application No. 61/783,012 entitled "PAGE CLUSTERING," filed Mar. 14, 2013, U.S. Provisional Application No. 61/783,045 entitled "PAGE RECONSTRUCTION" filed Mar. 14, 2013, and U.S. Provisional Application No. 61/782,893 entitled "SMART ANCHOR" filed Mar. 14, 2013, the entire disclosures of all of which are incorporated herein by reference.

TECHNICAL FIELD

The systems and methods disclosed herein relate to document clustering systems and in particular to automated document clustering systems.

BACKGROUND

Currently, there are a variety of systems that allow a user to cluster documents for processing. Document clustering is useful for sorting common documents. For example, clustering can be used to sort invoices that are received from multiple vendors. Ideally, a user would like to have a clustering system be able to sort documents with 100% accuracy without any user intervention. However, current systems fall short of this goal. This is due to various factors, such as poor document quality, shortcomings in clustering algorithms, incorrect template identification, lack of complete automation, and the like.

A common document clustering algorithm is the k-means clustering algorithm. The k-means algorithm requires that a user define a template document that is used for clustering. In addition, the user typically has to choose a number of clusters. The system will then cluster a number of documents into the defined number of clusters. However, problems can arise when using k-means clustering. For instance, if the user selects a template document that has been scanned using a low scanning resolution and contains multiple scanning errors; this can result in the k-means algorithm incorrectly clustering documents. Moreover, because the user has to define a number of clusters, the k-means algorithm may incorrectly sort the documents because the number of clusters was defined incorrectly. These types of errors can cause multiple iterations of the process and increased manual intervention. What is needed is a method for clustering documents that overcomes the current problems in clustering systems.

SUMMARY

Systems and methods are provided to solve these and other problems and disadvantages of the prior art. A group of similar documents are scanned for processing. For example, the documents can be a group of invoices from a specific vendor. The documents are processed in order to identify which of the documents will be used as template document. The template document is used to identify similar documents. For example, a company may use the template document to identify an individual invoice from a specific vendor from a group of documents from multiple vendors. Objects (e.g., a text object, such as a word) and their locations are identified in each of the documents. Occurrences of similar objects in the identified locations between the documents are determined. A document sorting algorithm is applied to generate a score for each of the documents. The score for each of the documents is generated based on a number of occurrences of similar objects between the documents. The generated score of each of the documents is used to identify the template document. The template document is then used to cluster the documents. This allows documents to be clustered without any user intervention.

BRIEF DESCRIPTION OF THE DRAWINGS

FIG. 3 is an exemplary diagram of documents that are used for clustering.

FIG. 4 is a table of occurrences of objects in documents that are clustered.

FIG. 5 is an exemplary diagram of documents that are used for clustering and template reconstruction.

FIG. 6 is a table of occurrences of objects in documents and the percentage of certainty of each object.

FIG. 9 is a diagram of two exemplary documents that are used to determine a template document.

DETAILED DESCRIPTION

Figure 1:
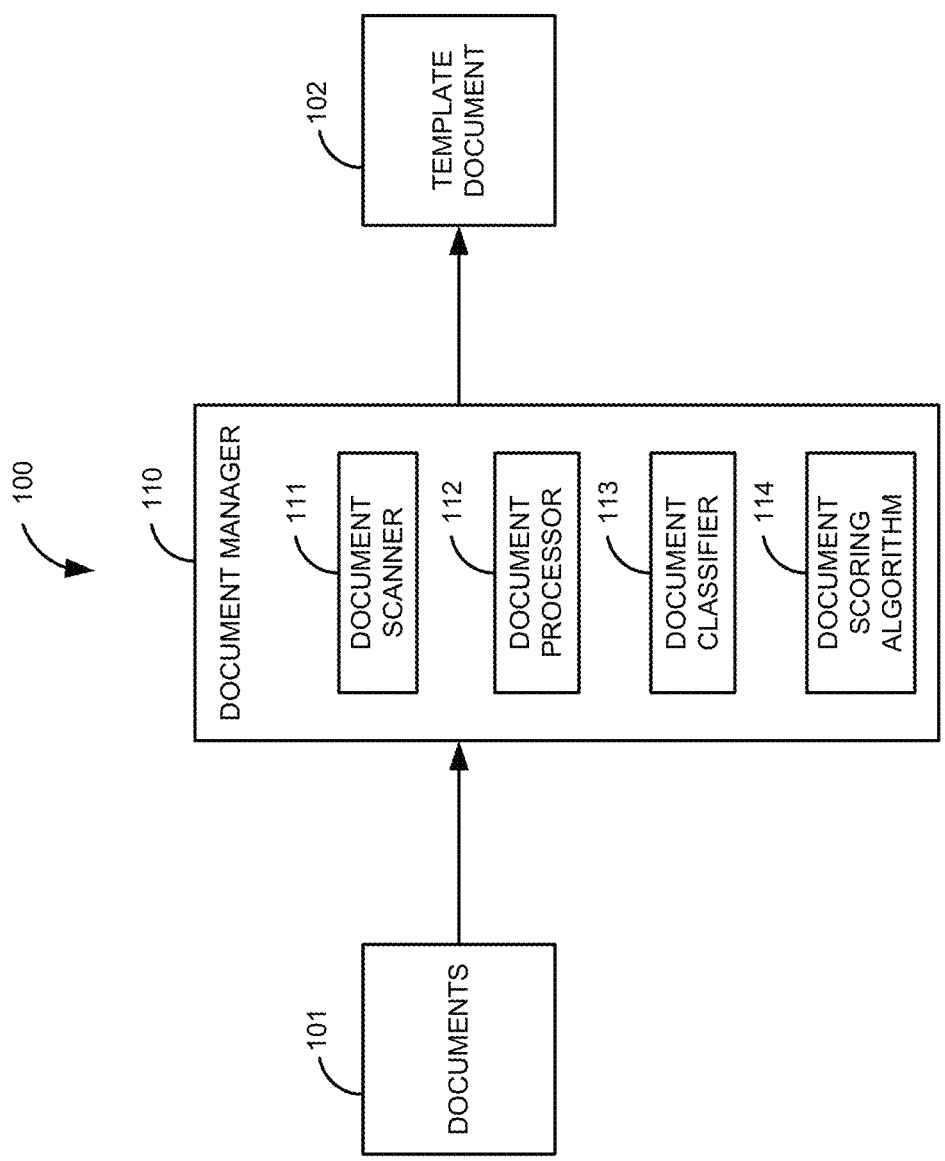
FIG. 1 is a block diagram of a first illustrative system for clustering documents.

FIG. 1 is a block diagram of a first illustrative system for clustering documents. The first illustrative system 100 comprises a document manager 110. The document manager 110 can be any hardware/software that can be used to manage documents 101, such as a scanner, a multifunction peripheral, a fax machine, a network based software application, and/or the like.

The document manager 110 comprises a document scanner 111, a document processor 112, a document classifier 113, and a document scoring algorithm 114. The document scanner 111 can be any hardware/software that can be used to scan and generate documents 101, such as a scanner, a network scanner, a fax machine, a multifunction peripheral, and/or the like. The document processor 112 can be any hardware/software that can process and manage documents 101. The document classifier 113 can be any hardware/software that can be used to classify/group/cluster documents 101. The document scoring algorithm 114 can be any algorithm to scoring documents 101.

FIG. 1 also includes the documents 101. The documents 101 are documents that are to be clustered or grouped into different classifications of documents. The documents 101 can be any type of document 101 that needs to be sorted or clustered, such as an invoice, a medical from, an employment agreement, a contract, a bill, a legal document, a tracking form, a ticket, a check, and the like. The documents 101 can be any number of documents 101. The documents 101 can be a single page, multiple pages, web pages, graphical pages, pictures, spread sheets, files, and/or the like. The documents are processed to identify one or more template documents 102. The template document 102 is a document that is used as a reference to cluster the documents 101 into different groups. The documents 101 used for identifying the template document 102 are typically similar documents 101. The template document 102 is identified from the documents 101 as the best document to perform clustering on the documents 101. For example, the documents 101 may be a group of similar invoices or contracts from a specific vendor. Once a template document 102 is identified, the documents 101 can then be clustered. For example, a company's billing department may receive hundreds of invoices from vendor A and vendor B. The company can use an identified template document 102 to cluster the invoices from vendor A in to one cluster and the invoices from vendor B into another cluster of documents. The advantage is that the documents 101 do not have to be sorted manually.

The documents 101 and/or the template document 102 may be physical documents that are scanned in by the document scanner 111. The documents 101 and/or the template document 102 may be generated by a device, such as a camera. The documents 101 and/or the template document 102 can be generated directly by a program, such as a word processing program, a spreadsheet, a presentation program, a graphical program, a picture management program, and/or the like. The documents 101 and/or the template document 102 can be in various forms, such as a Tagged Image File Format (TIFF) file, a Portable Document Format (PDF), a Rich Text Format (RTF), an Extended Markup Language (XML) document, a Hyper Text Markup Language (HTML) document/web page, a Graphics Interchange Format (GIF) file, and/or the like.

The documents 101 are received by the document processor 112. The documents 101 can be received from various sources, such as from the document scanner 111, a network scanner, a networked device, a database, a camera, and/or the like. The documents 101 can include a variety of objects. For example, objects in the documents 101 can include a text object, a picture object, an icon object, a graphic object, a logo object, a number, a symbol, a table, a graphical element, metadata in the documents 101, and/or the like. A text object may include a single letter, a word, a sentence, a paragraph, a heading, a page, a phrase, a footer, a header, a name, a marked change text, and/or the like. An object may comprise multiple objects. For instance, a picture may comprise multiple objects such as a car, a person, a building, and/or the like. A text object such as a sentence may comprise multiple text objects. Objects can be predefined. For example, text objects can include specific words or phrases.

The document processor 112 determines occurrences of similar objects in the identified locations of objects between the documents 101. The process of aligning and identifying locations of objects between documents is described in patent application Ser. No. 14/174,674 entitled "SYSTEM AND METHOD FOR DOCUMENT ALIGNMENT, CORRECTION, AND CLASSIFICATION," which was filed on Feb. 6, 2014 and is incorporated herein in its entirety by reference.

In addition, distances may be determined by using a character, word and/or line distance of a document. This can be useful for documents that are semi-formatted documents such as Hyper Text Markup Language (HTML) documents where the spacing between the characters and lines is consistent. In this embodiment, the distance is calculated based on a number of characters, words, and/or lines that are between the two objects. For example, if one of the objects was on line 1 two characters in and the second objects was on line 2, 4 characters in. The system could calculate the distance based on the two objects being one line apart and 2 characters in.

An object may be similar in various ways. For instance, a text object can be similar if it is the same word (even though the word is in one font and/or color in one document 101 and in a different font and/or color in another document 101). Likewise, a picture or logo object can be similar if it is in color in one document 101 and in black and white in a different document 101. Likewise, other features of the object may be used in determining that objects are similar, such as font size, upper case/lower case, individual letters being capitalized, and/or the like. Similar objects can also include objects in an unknown language, a phrase, a number, a punctuation mark, and/or the like.

The document processor 112 determines occurrences of similar objects in the identified locations of the plurality of objects between the documents 101. Determining the occurrences of similar objects between documents 101 can be accomplished in various ways. For example, referring to FIG. 3, the documents 101 may comprise documents 101A-101E. The documents 101A-101E are all documents 101 that are scanned by the document scanner 111. The documents 101A-101E each contains a unique word (aaa-eee) and the phrase "the quick brown fox jumps over the lazy dog." The process of scanning the documents 101A-101E has introduced errors into each of the documents 101A-101E. In this illustrative example, the errors are indicated by a question mark. In document 101A, the words quick, brown, over, and lazy were all scanned with at least one error. These types of errors can be introduced into the documents 101 in various ways. For example, the errors can be based on poor scanning quality, using a low scanning resolution (e.g., a low number of Dots Per Inch (DPI)), where the document 101 has been scanned multiple times, human spelling errors, and/or the like. The phrase "the quick brown fox jumps over the lazy dog" and the unique words are, in this example, are all at common locations (or approximately common locations) between the documents 101A-101E. However, having the objects at common locations is not necessary for this step. In one embodiment, the occurrences are based on the objects being in common locations and in another embodiment the occurrences are only based on the number of occurrences in all of the documents 101A-101E. In addition, the common locations can be determined based on one or more of a distance, a relative distance, and/or a relative angle.

The result of determining occurrences of similar objects between the documents 101A-101E is shown in FIG. 4. In this example, the object "the" has eight occurrences in the documents 101A-101E. The object "jumps" has three occurrences and so forth down to d?g", which has one occurrence. The more occurrences of an object, the more likely that the object is a valid object and does not include an error. The advantage to this approach is that it is language agnostic. The document processor 112 identifies objects based on the number of occurrences of the object in the documents 101A-101E. The document processor 112 does not have to know what language is being used. For example, this process could be applied to other languages, such as Spanish, German, French, and/or the like without any changes.

Alternatively, this process could be used on other languages, such as computer programming languages, computer instructions, and/or the like. In this embodiment, the process can be used to identify if similar code has been used between programs. The objects could be computer instructions in binary or instructions in a higher level programming language, such as Hyper Text Markup Language (HTML), Java, Java script, C, C++, and/or the like.

In another embodiment, the objects can be physical objects that are in a container (similar to the document 101), such as parts or goods. The objects are identified based on their weights and/or sizes in order to show the occurrences of objects between the containers.

The document processor 112 applies a document sorting algorithm 114 to generate a score for each of the documents 101A-101E. The score for each of the documents 101A-101E is based on the number of occurrences of similar objects between the documents 101A-101E. The document sorting algorithm 114 for determining the score can be implemented in various ways.

For example, the document processor 112 can use a summing algorithm 114 that sums the number of occurrences of similar objects between the documents 101A-101E. The document processor 112 generates the following scores (based on the results in FIG. 4) for the "aaa the ?uick ?rown fox jumps ?ver the ?azy dog" in document 101A as follows: 1 (for aaa)+8 (for the)+1 (for ?uick)+1 (for ?rown)+2 (for fox)+3 (for jumps)+1 (for ?over)+8 (for the)+1 (for ?azy)+3 (for dog) to equal a total of 29. Similarly, the document processor 112 generates the following scores for the remaining documents 101B-101E.

Document 101B 1+8+3+2+1+3+1+8+1+3=31
Document 101C 1+1+3+1+1+1+3+1+1+3=16
Document 101D 1+8+3+2+2+3+2+8+2+1=32
Document 101E 1+8+1+1+1+1+3+8+2+1=27

The result is the following scores for each of the documents 101A-101E.

| Document | Score |
|----------|-------|
| 101A | 29 |
| 101B | 31 |
| 101C | 16 |
| 101D | 32 |
| 101E | 27 |

The documents 101A-101E can be sorted based on the scores. In this example, document 101D has the highest score, which is based on a summing algorithm. The document 101D contains the fewest amount of errors. However, in other embodiments, a document sorting algorithm 114 that multiples the variables, divides the variables, sums the variables, subtracts the variables, separately or in combination can be used to generate a score for each of the documents 101A-101E.

In addition, other factors can be included in the document sorting algorithm 114, such as, scanning resolutions, sources of the documents 101, a type of document 101, a provider of the documents 101, use of color verses black and white scanned documents 101, fronts, font sizes, use of meta data in the documents 101, use of document change tracking, and/or the like. For example, the document sorting algorithm 114 could add an additional number to the score for documents that were scanned in color or use a specific font or combination of fonts. The document sorting algorithm 114 could add or subtract from the score for a document 101 if the document 101 does not use a specific font or was received from a specific vendor. Alternatively the score could be adjusted based on whether the document 101 was encoded using a specific format, such as HTML, PDF, or GIF. The score could be adjusted based on the document being generated from a specific word processing program or graphical processing program.

Based on the scores, the document classifier 113 identifies the template document 102. In this example, the document 101D is identified to be the template document 102 because document 101D has the highest score (32). The template document 102 (101D) can then be used to cluster documents 101A-101E along with additional documents 101.

Once the template document 102 has been identified, the first illustrative system 100 can use the documents 101 to make corrections to the template document 102. Error correction in the template document 102 is further illustrated in FIG. 5. In FIG. 5, each of the documents 101A-101E contain one error. For example, in document 101A, the word quick has been scanned with an error (?qick). The document processor 112 determines an amount of certainty for occurrences of similar objects in a common document location between the documents 101A-101E. In FIG. 5, each of the word objects in the documents 101A-101E beginning with aaa-eee through dog are in common document locations between the documents 101A-101E.

The amount of certainty is the degree to which the object occurs in the common locations between the documents 101A-101E relative to the total number of documents (five in this example). The amount of certainty for documents 101A-101E in FIG. 5 is shown in FIG. 6. The word objects the, the, lazy, and dog occur in all the common locations in each document 101A-101E. The word objects over, jumps, fox, brown, and quick only occur four times because each of these word objects contain an error in one of the documents 101A-101E. The remaining word objects only occur once in the documents 101A-101E.

The document processor 112 identifies common object locations based on a minimum certainty threshold value. The minimum certainty threshold value is a minimum number of documents 101A-101E that the object occurs in. The minimum certainty threshold value can be a user defined value that indicates that there is a high probability that the object is correct and has been scanned properly. Alternatively, the minimum certainty threshold value can be defined by the system. In one embodiment, the minimum certainty threshold value can set based on the type of object. For example, a minimum certainty threshold value of 60% can be defined for graphical objects and a minimum certainty threshold value of 80% can be defined for text objects. The minimum certainty threshold value can be defined based on a file type, a font, a font size, a language, and/or the like.

An 80% minimum certainty threshold value in this example is a good threshold because it indicates that the word object is in at least four of the five documents 101A-101E at the common location between the documents 101A-101E. In FIG. 6, a minimum certainty threshold value of 80% would select the words the, the, lazy, dog, over, jumps, fox, brown, and quick as common objects between documents 101A-101E. The remaining objects would not be considered common objects because their certainty value is only 20%.

In this example, the word "the" occurs twice in each document 101A-101E at two different locations. In this embodiment, each location of the word "the" is identified as a separate text object with a separate certainty value. However, in an alternative embodiment, the certainty of the word "the" can be based on how often the word "the" occurs in the documents 101A-101E regardless of the number of locations. For example, the word "the" occurs in each of the documents at least once.

The document processor 112 determines that the template document 102 (assume that document 101D is the template document 102 in this example) contains an error for an individual word object in at least one of the common document locations. In this example, the template document 102 (101D) contain an error in the word jumps (?umps). In response to determining the error in the template document 102 (101D), the document processor 112 replaces the object "?umps" with an individual object in the common location between the documents 101 in the template document 102 (101D). In this example, the document processor 112 would replace the object "?umps" in the template document 102 (101D) with the word jumps because the word jumps is determined to be correct because it is common in the other four documents at the same common location. By removing errors from the template document 102, improved clustering of documents 101 can result because the template document 101 now contains fewer errors.

In one embodiment, the corrected template document 102 is stored separately by the document processor 112 to process the documents 101 for clustering. However, in other embodiments the actual document 101D is error corrected before clustering. Likewise, this process can be applied to the remaining documents 101A-101C and 101E before clustering.

Figure 2:
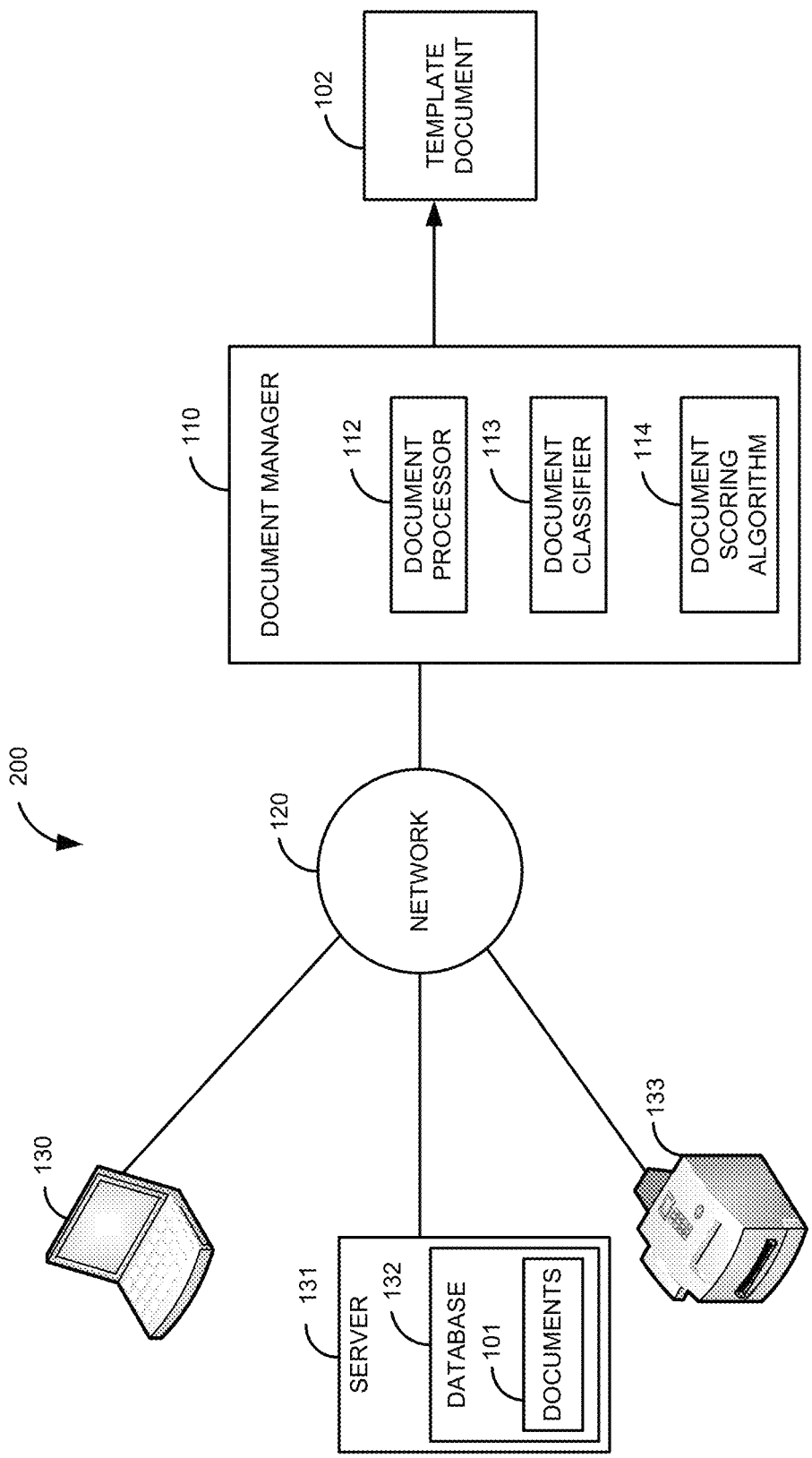
FIG. 2 is a block diagram of a second illustrative system for clustering documents.

FIG. 2 is a block diagram of a second illustrative system 200 for clustering documents 101. The second illustrative system 200 is an illustration of the system of FIG. 1 in a networked environment. The second illustrative system 200 comprises a computer 130, a server 131, a network scanner 133, a network 120, and the document manager 110.

The computer 130 can be any computing device, such as a personal computer, a Personal Digital Assistant (PDA), a telephone, a smart telephone, a laptop computer, a tablet computer, and/or the like. The server 131 can be any hardware/software that can manage documents 101/102, such as a file server, a database server, a web server, and/or the like. The server 131 further comprises a database 132. The database 132 can be any type of database, such as a relational database, an object oriented database, a directory service, a file system, and/or the like. The database 132 comprises the documents 101. In this illustrative embodiment, the document manager 110 only comprises the document processor 112 and the document classifier 113.

The document manager 110 is connected to a network 120. The network 120 can be or may include any network that can send and receive information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 120 can use a variety of protocols, such as Ethernet, Internet Protocol (IP), 802.11G, Simple Network Management Protocol (SNMP), and the like.

The document processor 112 can receive documents 101 from the devices 130, 131, and 132 on the network 110. For example, a user at computer 130 could create the documents 101 that are either sent directly to the document processor 112 or stored in the database 132. A user at computer 130 could fill out an invoice (document 101) and send the invoice to a company for processing. The invoice (document 101) could then be stored in the database 132 for processing by the document processor 112 as described in FIG. 1.

Alternatively, the network scanner 133 could be used to scan the documents 101 for storage in the database 132. The scanned documents 101 could be sent directly to the document processor 112 from the network scanner 133.

In another embodiment, the document processor 112 can periodically retrieve the documents 101 from the file server 131 via the database 132 for processing. This way, invoices/contracts can be processed based on pay periods or other time periods.

Figure 7:
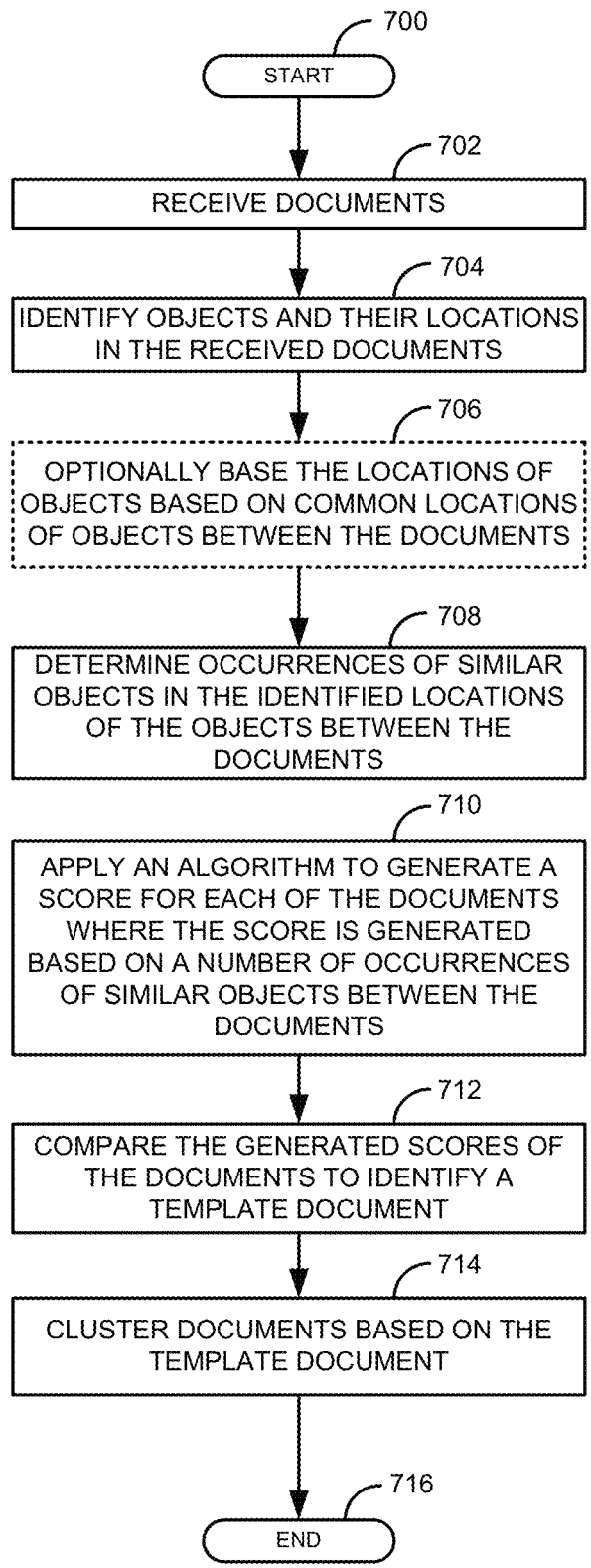
FIG. 7 is a flow diagram of a process for clustering documents.
Figure 8:
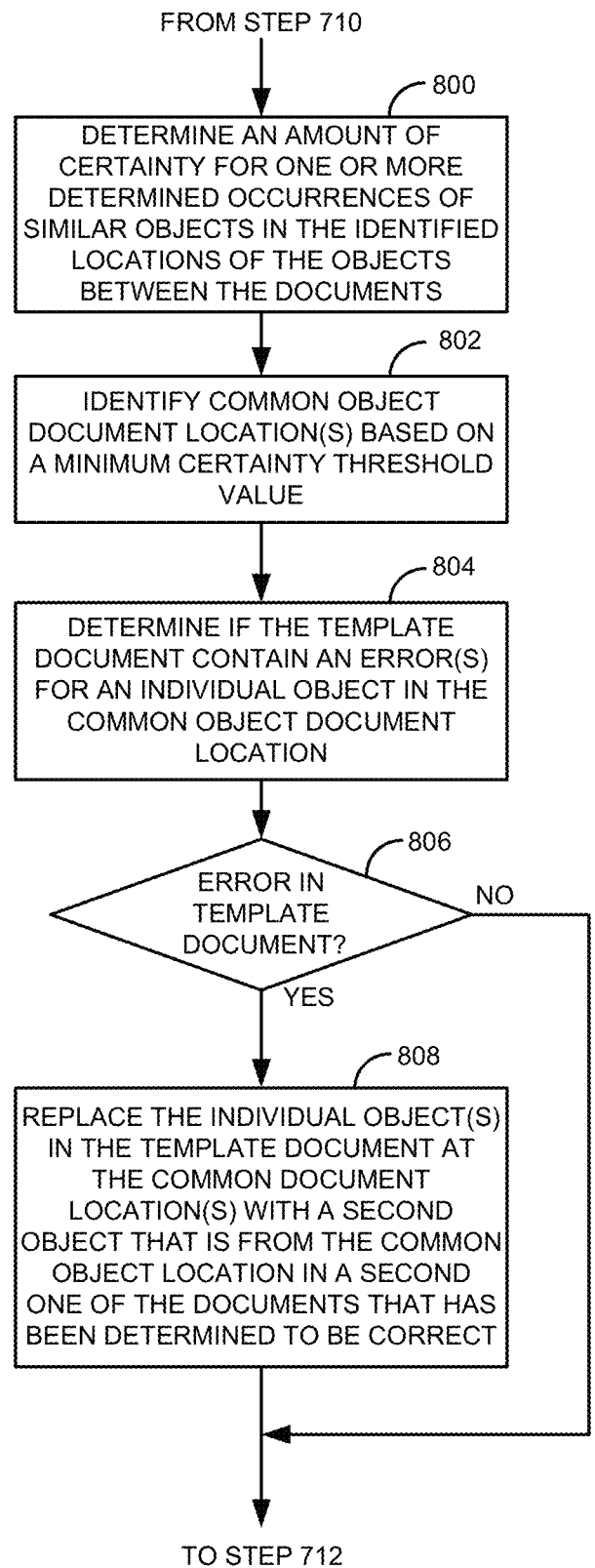
FIG. 8 is a flow diagram of a process for reconstructing a template document.

FIG. 7 is a flow diagram of a process for clustering documents. Illustratively, the document manager 110, the document scanner 111, the document processor 112, the document classifier 113, the computer 130, the server 131, and the network scanner 133 are stored-program-controlled entities, such as a computer or processor, which performs the method of FIGS. 7-8 and the processes described herein by executing program instructions stored in a tangible computer readable storage medium, such as a memory or disk. Although the methods described in FIGS. 7-8 are shown in a specific order, one of skill in the art would recognize that the steps in FIGS. 7-8 may be implemented in different orders and/or be implemented in a multi-threaded environment. Moreover, various steps may be omitted or added based on implementation.

The process starts in step 700. The documents 101 are received in step 702. Objects and their locations in the received documents are identified in step 704. Identifying locations of objects can be optionally based on the occurrences of similar objects in common locations between the documents in step 706. Occurrences of similar objects are determined in the identified locations of the objects between the documents in step 708. In addition to the number of occurrences of similar objects between the documents, other factors can be considered, such as fonts, font size, object color, object size, relative object size, weight, three dimensional object size, plural verses singular (i.e., "page" versus "pages" can be considered the same word), misalignment due to use of different fonts/font sizes, and/or the like.

For example, if one vendor uses one font and a second vendor uses a different font for the same document that misaligns the word locations relative to each other in the documents, the process can take into consideration the differences in the fonts/font sizes to compare the documents even though the word locations are different (i.e., a font causes a word object or picture object to move to the next line because the font uses a bigger character size than another font). The process will calculate a different location based on the different font/font size. This process can be accomplished across multiple pages within a document.

Identification of documents with misaligned objects can be initially identified based on word counts between the documents. Even though one of the documents is misaligned, the process of counting words still works in the same manner.

An algorithm is applied to generate a score for each of the documents in step 710. The score is generated based on at least a number of occurrences of similar objects between the documents in step 710. The process compares the scores of the documents to identify a template document in step 712. The process clusters the documents based on the template document in step 714. The process ends in step 716.

FIG. 8 is a flow diagram of a process for reconstructing a template document. The process described in FIG. 8 goes between steps 710 and step 712 of FIG. 7. After applying the algorithm in step 710, the process determines an amount of certainty for one or more occurrences of similar objects in the identified locations of the objects between the documents in step 800. The process identifies, in step 802, common object document location(s) based on a minimum certainty threshold value. The process determines, in step 804, if the template document contains an error(s) at an individual object in the common object document location(s).

If there is not an error in the template document in step 806, the process goes to step 712. If there is an error in the template document in step 806, the process replaces the individual object(s) in the template document at the common document locations with a second object(s). The second object(s) is from the common object location(s) of a second one of the documents that has been determined to be correct. The process goes to step 712.

FIG. 9 is a diagram of two exemplary documents 101F-101G that are used to determine a template document 102. The documents 101F-101G are examples of two invoices from a vendor (Company ABC) that have been sent to Company XYZ for goods shipped to Company XYZ. Document 101F is an invoice document that does not contain any errors. Document 101G is an invoice document that contains several errors that have occurred as a result of being scanned. In the sentence "Monthly invoice to Company XYZ for goods shipped to Company XYZ for the period of:" the word "to" has been scanned as "ta." In addition, a user has left a note 900 attached to the document 101F that covers part of Company ABC's address when document 101F was scanned. The note 900 also introduces additional text of a "Note to Billing." These are some common examples of how errors can be introduced as part of the scanning process.

The above described process can be used compare the documents 101F and 101G along with other documents to generate scores of the documents 101F-101G. The scores can then be used to identify a template document 102. In this example, the document 101F would be identified as the template document because it has fewer errors than the document 102G.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   scanning, by an electronic scanner, a plurality of documents to produce electronic representations of the plurality of scanned documents;
   receiving, by a microprocessor, the electronic representations of the plurality of scanned documents;
   for each of the electronic representations of the plurality of scanned documents, identifying, by the microprocessor, a plurality of objects and physical locations of each of the plurality of objects within the electronic representations of the plurality of scanned documents;
   determining, by the microprocessor, occurrences of objects in same identified physical locations of each of the plurality of objects between the electronic representations of the plurality of scanned documents, wherein the objects comprise at least one of: a same text, a same letter, a same word, a same picture, a same logo, a same phrase, a same number, a same capitalization, a same case, and a same punctuation mark;
   applying, by the microprocessor, a document sorting algorithm to generate a score for each of the electronic representations of the plurality of scanned documents, wherein the score for each of the electronic representations of the plurality of scanned documents is generated based on a number of occurrences of objects in the same identified physical locations between the plurality of scanned documents; and
   comparing, by the microprocessor, the generated score of each of the electronic representations of the plurality of scanned documents to identify a template document, wherein the template document is one of the plurality of scanned documents.

2. The method of claim 1, further comprising:
   determining an amount of certainty for an occurrence of objects in a common object document location between the electronic representations of the plurality of scanned documents;
   identifying the common object document location based on a minimum certainty threshold value;
   determining that the template document contains a scanned error for an individual object in the common object document location in the template document; and
   in response to determining that the template document contains the scanned error for the individual object in the common object document location in the template document, generating an updated electronic template document, by replacing the individual object in the common object document location in the template document with a second object, wherein the second object is from the common object location in a second one of the electronic representations of the plurality of scanned documents that has been determined to be correct.

3. The method of claim 2, wherein the scanned error for the individual object in the template document is determined based on a number of occurrences of the objects in the common document location in the electronic representations of the plurality of scanned documents.

4. The method of claim 2, wherein each of the electronic representations of the plurality of scanned documents comprises at least two separate objects that are at different common locations between the electronic representations of the plurality of scanned documents and wherein the amount of certainty is determined based on one of:
   the two separate objects; or
   a single one of the two separate objects.

5. The method of claim 1, wherein the objects comprises at least one of: a text object in an unknown language, an object that is part of a computer programming language, a phrase, a number, a punctuation mark, a text object, a graphical object, a logo, and a picture.

6. The method of claim 1, wherein the common locations are determined based on at one or more of a distance, a relative distance, a relative angle, a character distance, a word distance, and line distance.

7. The method of claim 1, wherein the objects are text objects and wherein the electronic representations of the plurality of scanned documents are received from the electronic scanner.

8. The method of claim 1, wherein the document sorting algorithm generates the score for each of the electronic representations of the plurality of scanned documents by at least one of:

summing the number of occurrences of objects between the electronic representations of the plurality of scanned documents; and multiplying the number of occurrences of objects between the electronic representations of the plurality of scanned documents.

9. The method of claim 1, wherein the template document is used to cluster the electronic representations of the plurality of scanned documents based on the template document.

10. The method of claim 1, wherein determining occurrences of the objects in the identified physical locations of the plurality of objects between the electronic representations of the plurality of scanned documents further comprises recalculating the identified physical locations based on a misalignment of the identified physical locations due to a use of at least one of a different font and a different font size used by a scanner when electronically scanning one or more of the electronic representations of the plurality of scanned documents.

11. A system comprising:
an electronic scanner configured to scan a plurality of documents to produce the electronic representations of the plurality of scanned documents;
a document processor comprising a microprocessor configured to receive the electronic representations of the plurality of scanned documents, for each of the electronic representations of the plurality of scanned documents, identify a plurality of objects and physical locations of each of the plurality of objects, determining occurrences of objects in same identified physical locations of each of the plurality of objects between the electronic representations of the plurality of scanned documents within the electronic representations of the plurality of scanned documents, wherein the objects comprise at least one of: a same text, a same letter, a same word, a same picture, a same logo, a same phrase, a same number, a same capitalization, a same case, and a same punctuation mark, and apply a document sorting algorithm to generate a score for each of the electronic representations of the plurality of scanned documents, wherein the score for each of the electronic representations of the plurality of scanned documents is generated based on a number of occurrences of the objects in the same identified physical locations between the electronic representations of the plurality of scanned documents; and
a document classifier configured to compare the generated score of each of the electronic representations of the plurality of scanned documents to identify a template document, wherein the template document is one of the plurality of scanned documents.

12. The system of claim 11, wherein the document processor is further configured to determine an amount of certainty for an occurrence of objects in a common object document location between the electronic representations of the plurality of scanned documents, identify the common object document location based on a minimum certainty threshold value, determine that the template document contains a scanned error for an individual object in the common object document location in the template document, and generate an updated electronic template document by replacing the individual object in the common object document location in the template document with a second object in response to determining that the template document contains the scanned error for the individual object in the common object document location in the template document, wherein the second object is from the common object location in a second one of the electronic representations of the plurality of scanned documents that has been determined to be correct.

13. The system of claim 12, wherein the scanned error for the individual object in the template document is determined based on a number of occurrences of the objects in the common document location in the electronic representations of the plurality of scanned documents.

14. The system of claim 12, wherein each of the electronic representations of the plurality of scanned documents comprises at least two separate objects that are at different common locations between the electronic representations of the plurality of scanned documents and wherein the amount of certainty is determined based on one of:
the two separate objects; or
a single one of the two separate objects.

15. The system of claim 11, wherein the objects comprises at least one of: a text object in an unknown language, an object that is part of a computer programming language, a phrase, a number, a punctuation mark, a text object, a graphical object, a logo, and a picture.

16. The method of claim 11, further comprising a scanner that generates the electronic representations of the plurality of scanned documents and wherein the objects are text objects.

17. The system of claim 11, wherein the document sorting algorithm generates the score for each of the electronic representations of the plurality of scanned documents by at least one of:
summing the number of occurrences of objects between the electronic representations of the plurality of scanned documents; and
multiplying the number of occurrences of objects between the electronic representations of the plurality of scanned documents.

18. The system of claim 11, wherein the template document is used to cluster the electronic representations of the plurality of scanned documents based on the template document.

19. The system of claim 11, wherein document processor is further configured to recalculate the identified physical locations based on a misalignment of the identified physical locations due to a use of at least one of a different font and a different font size used by an electronic scanner when electronically scanning one or more of the electronic representations of the plurality of scanned documents.

20. A system comprising:
an electronic scanner configured to scan a plurality of documents to produce electronic representations of the plurality of scanned documents;
a document processor comprising a microprocessor that is configured to receive the electronic representations of the plurality of scanned documents,
for each of the electronic representations of the plurality of scanned documents, identify a plurality of objects and locations of each of the plurality of objects, determine occurrences of objects in same identified physical locations of each of the plurality of objects between the electronic representations of the plurality of scanned documents, wherein the objects comprise at least one of: a same text, a same letter, a same word, a same picture, a same logo, a same phrase, a same number, a same capitalization, a same case, and a same punctuation mark, apply a document sorting algorithm to generate a score for each of the electronic representations of the plurality of scanned documents, wherein the score for each of the electronic representations of the plurality of scanned documents is generated based on a number of occurrences of the objects in the same identified physical locations between the electronic representations of the plurality of scanned documents, determine an amount of certainty for an occurrence of the objects in a common object document location between the electronic representations of the plurality of scanned documents, identify the common object document location based on a minimum certainty threshold value, determine that a template document contains a scanned error for an individual object in the common object document location in the template document, and generate an updated electronic template document by replacing the individual object in the common object document location in the template document with a second object in response to determining that the template document contains the scanned error for the individual object in the common object document location in the template document, wherein the second object is from the common object location in a second one of the electronic representations of the plurality of scanned documents that has been determined to be correct; and a document classifier configured to compare the generated score of each of the electronic representations of the plurality of scanned documents to identify the template document, wherein the template document is one of the plurality of scanned documents and cluster the electronic representations of the plurality of scanned documents based on the template document.

* * * * *